United States Patent [19]

Kay

[11] Patent Number: 4,669,881
[45] Date of Patent: Jun. 2, 1987

[54] BIAS SIGNAL FILTER FOR A RING LASER

[75] Inventor: Robert M. Kay, Seminole, Fla.

[73] Assignee: Honeywell Inc., Minneapolis, Minn.

[21] Appl. No.: 631,042

[22] Filed: Jul. 16, 1984

[51] Int. Cl.[4] ............................................. G01C 19/64
[52] U.S. Cl. ..................................... 356/350; 328/165
[58] Field of Search ...................... 356/350; 370/110.3;
375/95, 96; 328/165

[56] References Cited

U.S. PATENT DOCUMENTS

| 3,627,425 | 12/1971 | Doyle | 356/350 |
| 4,344,706 | 8/1982 | Ljung | 356/350 |
| 4,353,001 | 10/1982 | Tanihashi | 328/165 |
| 4,529,311 | 7/1985 | Morgan et al. | 356/350 |

OTHER PUBLICATIONS

IEEE Journal of Quantum Electronics, vol. QE-16, No. 9, Sep. 1980, pp. 918-936, IEEE, New York, US; W. W. Chow et al.: "Multioscillator Laser Gyros".
Proceedings SPIE Laser Range Instrumentation, Oct. 1967, pp. 99-106, Society of Photo-Optical Instrumentation Engineers Proceedings, El Paso, Texas, US; H. M. Volk: "An Operating Three Axis Laser Gyro Triad".

Primary Examiner—Vincent P. McGraw
Assistant Examiner—S. A. Turner
Attorney, Agent, or Firm—Robert A. Pajak

[57] ABSTRACT

Disclosed is an apparatus for obtaining an output signal from a dithered ring laser angular rate sensor devoid of dither spill over into the output signal. For a single sensor, the output signal is sampled at two points separated in time by one half of the dither period. Also disclosed is an inertial sensor system in which each of the sensors are sampled about a common strobe pulse and separated in time corresponding to one half of their respective dither periods.

9 Claims, 6 Drawing Figures

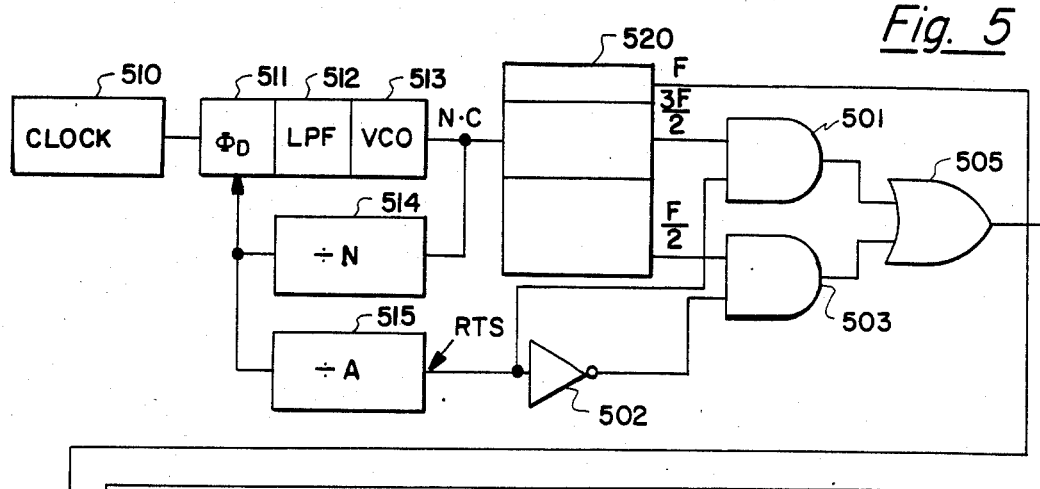
*Fig. 5*
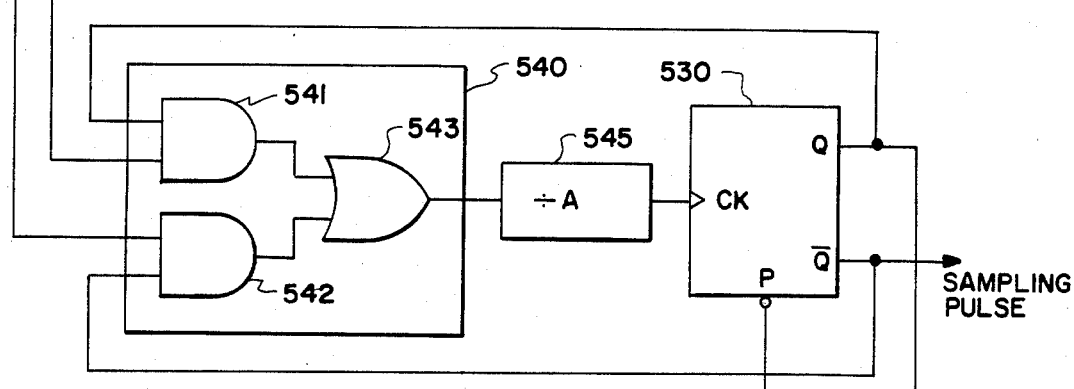
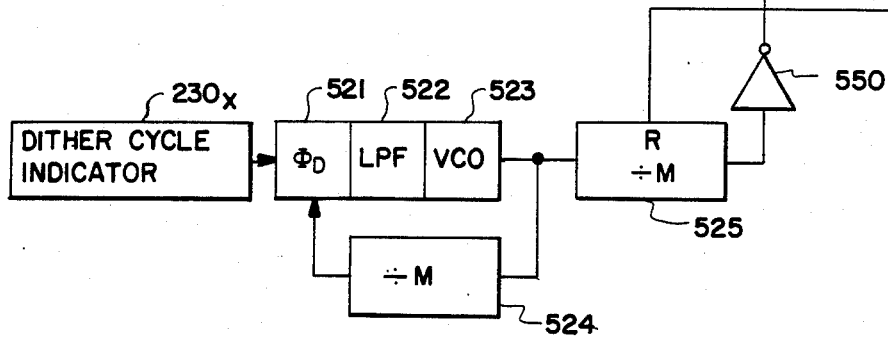
*Fig. 5A*
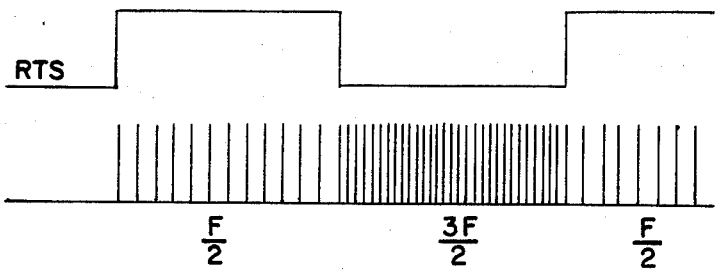

BIAS SIGNAL FILTER FOR A RING LASER

The Government has rights in this invention pursuant to Contract No. F04701-76-C-0135, awarded by Dept. of the Air Force.

BACKGROUND OF THE INVENTION

This invention relates to ring laser angular rate sensors or ring laser gyroscopes. Particularly, the invention relates to dithered ring laser angular rate sensors, and specifically an apparatus for filtering out dither signals in the output thereof.

In a ring laser angular rate sensor, two electromagnetic waves or beams of monochromatic light traverse an optical closed-loop path in opposite directions. The path encloses an area of a plane. If the sensor is caused to rotate about an input axis which has a component normal to the plane, the frequency of one of the beams will be increased while the frequency of the other of the beams will be reduced. The direction and rate of rotation about the input axis can be measured from the beat frequency, i.e. the frequency difference between the beams. Techniques for generating signals representative of the beat frequency are well known and need not be described herein.

Inherent in ring laser angular rate sensors, as is well known, is the phenomenon known as lock-in. One method of avoiding lock-in is to bias the counter-propagating waves or laser beams with a periodic bias. This is sometimes referred to as dithering the optical beams of light. Dithering is described in U.S. Pat. No. 3,373,650 by Killpatrick, entitled "Laser Angular Rate Sensor", assigned to the same assignee as the present application. As described in the above referred to patent, dithering may be applied to a ring laser angular rate sensor by providing a mechanical biasing means for rotationally oscillating the sensor back and forth. Alternatively, dithering of the optical beams may be induced by a Faraday cell which is capable of optically biasing the laser beams directly.

Dithering schemes like those above, as well as others, cause the usual sensor output to contain a component related to the periodic bias. This bias signal component is sometimes referred to as bias spill-over. In some sensor applications, spill-over of the bias signal into the output signal can be tolerated. However, in navigational control applications bias spill-over can cause unacceptable deleterious effects.

A BRIEF DESCRIPTION OF THE INVENTION

In the present invention, a dithered ring laser angular rate sensor output signal is sampled at sampling points separated in time by one half of the dither period. A filtered information signal is provided by taking the average of the sampled data pair thereby removing the bias spill-over signal component from the sensor output. In navigational systems using a plurality of sensors, sampling points for each sensor are taken about a common strobe pulse and separated in time by one half of the dither period of the individual sensor.

A BRIEF DESCRIPTION OF THE DRAWINGS

FIG. 5 is a schematic block diagram showing details of one implementation of a half dither period timing means and a common strobe.

FIG. 5A illustrates a timing diagram for the circuit of FIG. 5.

DETAILED DESCRIPTION OF THE INVENTION

Figure 1:
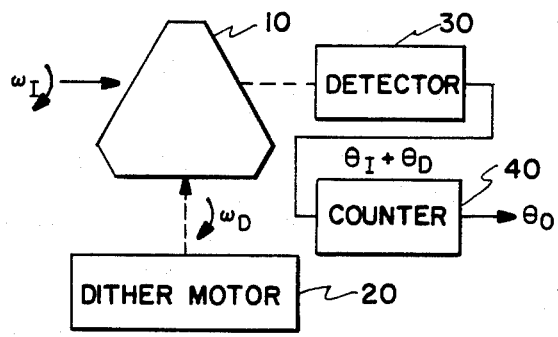
FIG. 1 is a schematic block diagram of a ring laser angular rate sensor.

Shown in FIG. 1 is a ring laser angular rate sensor system well known in the art. Block 10 supports two counter-propagating beams in the manner well known in the art. Couple to block 10 is a dither motor 20 for rotationally oscillating block 10 in a manner well known in the art and particularly described in the aforementioned U.S. Pat. No. 3,373,650. The sensor is responsive to inertial rotation $\omega_I$ and a rotational oscillation $\omega_D$ provided by dither motor 20. A detector 30 is coupled to block 10 to be responsive to the counter-propagating laser beams to provide an indication of the rotation of the sensor, i.e. rotation of block 10. One example of detector 30, also well known in the art, provides an interference pattern so that $2\pi$ phase changes between counter-propagating laser beams may be counted by counter 40 coupled to detector 30. Counter 40 provides an output indicative of the sum of $\Theta_I$ (inertial input rotation angle at any instant) and $\Theta_D$ (inertial rotation angle caused by the dithered motor 20).

As indicated earlier, the system described in FIG. 1 is well known in the art. The output of counter 40 contains dither motion components which must be substracted in order to determine the actual inertial input rotation angle $\Theta_I$ and rate $\omega_I$. It should be noted that any sensor bias, such as provided by dither motor 20, which affects the counter-propagating laser beams will affect the output of counter 40.

Figure 2:
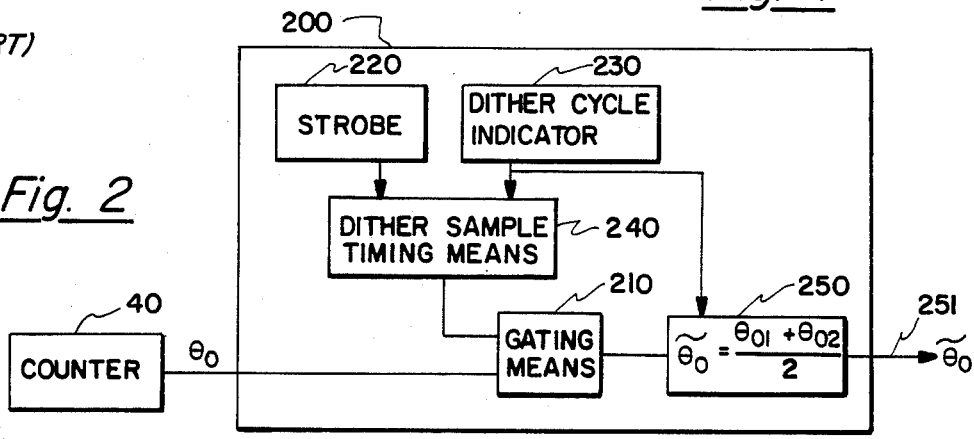
FIG. 2 is a schematic block diagram showing one embodiment of the invention.

FIG. 2 is a block diagram showing one embodiment of a dither filter of the present invention. The output of counter 40 is presented to system block 200 which includes diagramatically a gating means 210, strobe means 220, dither cycle indicator 230, dither sample timing means 240 and averaging means 250. The output of the dither filter is indicated at 251 having a symbolic notation $\widetilde{\Theta}_o$, hereinafter referred to as to the "filtered output".

As illustrated in FIG. 2, dither sample timing means 240 is responsive to a strobe pulse provided by strobe 220 and to the output dither cycle indicator 230. Dither cycle indicator 230 provides the intended function of providing a timing signal representative of the sensor's dither frequency and/or period such as established by dither motor 20. Dither cycle indicator, may for example, provide a pulse for each dither cycle and synchronized therewith.

As is well known in the art, dither motors may be provided by piezoelectric devices which are used not only to provide the dither motion, but also provide a signal indicative of the dither frequency. By way of example, dither cycle indicator 230 may be provided by an amplitude to pulse conversion circuit responsive to the dither bias provided by dither motor 20. Thus indicator 230 may then provide a stream of pulses separated in time by the actual dither period. Circuits of this type are well known and therefore are not described in detail herein.

Strobe 220 is a periodic pulse signal generator which provides a continuous series of pulses at a rate to provide sufficient accuracy of the dither filter. As an example, the strobe pulse may occur, relative to the dither motion, once each dither cycle.

The dither sample timing means 240 combines the strobe pulse and the dither timing signal for providing two timing pulses relative to the strobe pulse and separated in time by one half the dither period. Gating means 210 is enabled by gate pulses provided by dither sample timing means 240 so as to pass the information from counter 40 to averaging means 250. Averaging means 250, in response to the strobe pulse 220 provides an output signal representative of the average of the two samples of counter 40 separated by one half of the dither period. Thus, the output of the dither filter is a signal 251 representative of the average of two sample counts of counter 40 as made available at the output thereof after each strobe pulse 220.

The output of the dither filter is a sample which is substantially devoid of the dither signal and therefore only represents true inertial rotation of the sensor. The dither filter output may then be provided into usual inertial sensor data systems (not shown).

Figure 3:
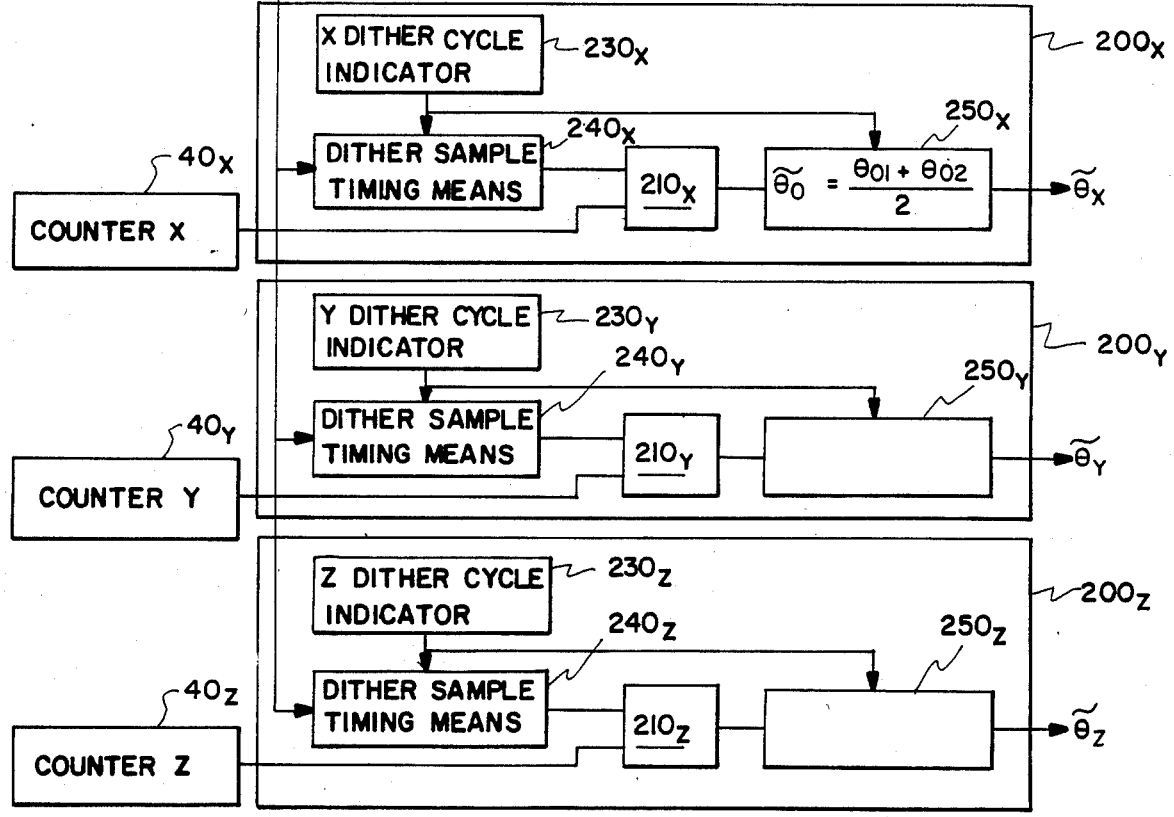
FIG. 3 is a schematic block diagram of another embodiment of the invention in combination with three ring laser angular rate sensors.

Inertial sensing systems usually employ three rotation sensors orthogonal to each other for providing rotation information to a navigational computer. Systems employing rotationally dithered ring laser sensors are configured to independently oscillate at the resonant frequency of a dither suspension system. Since the sensors are typically located in close proximity to each other, there exists cross talk which spills over into each of the sensors output due to dither spill-over. The dither spill-over cross talk can adversely affect the overall system performance. Shown in FIG. 3 is another embodiment of the invention illustrating the principals of the invention in combination with three ring laser angular rate sensors for measuring rotation in the "X", "Y", and "Z" axes. There shown is essentially three dither filters 200x, 200y, and 200z. In FIG. 3, components having the same intended function as those in FIG. 2 have the same numeral designation with the "x, y, and z" suffix designator so as to identify the three independent dither filters. However, in FIG. 3, strobe pulse generator 220 is shown external from digital filters 200x, 200y, and 200z. The strobe 220 in FIG. 3 provides a common strobe pulse to each of the dither sample timing means 240x, 240y, and 240z. Enabling gate 210x passes information from counter 40x to averaging means 250x for providing filtered "x" output, i.e. a count representative of rotation about the x axis. In like manner, averaging means 250y provides the filterd output "y", and averaging means 250z provides filtered "z" output.

In operation, the dither filtered output for rotational outputs x, y, and z are based upon two samples for each of the sensors about a common strobe pulse and separated in time by substantially one half the dither period corresponding to each of the unique sensors. Since the sampling of the counter data from each of the three axes "X, Y, and Z" corresponds to a single point in time, namely that of the strobe pulse, cross talk of the spillover in the gyro outputs is substantially eliminated in the output signals. Further, the phenomenon knowing as coning—the input axis to the sensors moves in the shape of a cone due to cross coupling of the dither motor mechanisms—is substantially suppressed.

It should be noted that the dither cycle indicators 230x, 230y, and 230z provide real time signals depicting the existing conditions of the dither motion. These variables are typically changeable with temperature, time, and in some cases changes due to a single sensor changeout. Thus, the dither sample timing means 240x, 240y, and 240z must be a dynamic system responsive to the strobe pulse and the corresponding dither cycle signals.

Illustrated in 4 is a timing diagram illustrating the obtaining times of the three counters 40x, 40y, and 40z at the two sample times separated by one half the dither period and centrally spaced about a strobe pulse identified in FIG. 5 as RTS. FIG. 5 illustrates the situation where each of the sensors has a unique dither period (Tx, Ty, and Tz) which is slightly different than the others.

Figure 4:
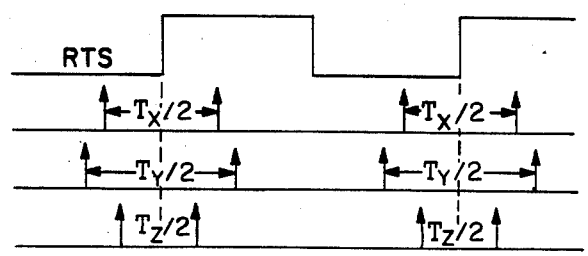
FIG. 4 is a timing diagram further illustrating the principals of the invention in combination with three sensors.

Shown in FIG. 5 is a schematic diagram showing one example of an implementation of a dither sample timing means 240. Thereshown is only one dither sample timing means 240x of dither filter 200x. The circuit is intended to diagrammatically illustrate in limited detail an exemplary method to provide the intended function. Of course, there are a variety of circuit schemes to provide the intended timing diagram as illustrated in FIG. 4.

Referring now to FIG. 5, an input clock 510 is passed through a phase lock loop including a phase detector 511, low pass filter 512, variable controlled oscillator 513 and divider 514 for producing a series of clock pulses "N" times the clock input signal. The output of divider 514 is further passed through a divider circuit 515 dividing the input thereof by "A" which defines the strobe pulse as "RTS". In turn, the output of VCO 513 is passed through a divider network 520 for provding clock signals having frequency F, 3F/2, and F/2 and synchronized with RTS.

Signal 3F/2 is logically combined with the RTS signal in AND circuit 501. The RTS signal is inverted through inverter 502 and logically combined with signal F/2 in AND circuit 503. The outputs of AND circuits 501 and 503 are logically operated on by OR circuit 505. The output of logic circuit 505 is thus, either F/2 or 3F/2, depending on the state of signal RTS.

In a somewhat similar fashion, the output of the dither cycle indicator 230x is passed through a phase lock loop including phase detector 521, low pass filter 522, VCO 523 and divider 524 for dividing the output of VCO by "M". The output of the VCO is passed through another divider 525 having an output as the preset input of a flip-flop 530. Divider 525 also divides the VCO 523 output by "M". The divider 525 also includes a reset input which is provided by the Q output of flip-flop of 530.

A signal combining circuit 540 includes AND-gate 541 which provides the AND function of the Q output of flip-flop 530 and variable frequency output of OR circuit 505. Further combining circuit 540 includes AND-gate 542 for providing the AND function of frequency signal F and the NOT-Q output of flip-flop 530. The output of AND-gates 541 and 542 are presented to OR circuit 543 having an output presented to the clock input of flip-flop 530 through divider circuit 545 for dividing by "A".

In operation, the circuit of FIG. 5 provides the intended sampling pulses to gating means 210x in a manner as depicted in FIG. 4. The sampling pulses are provided by the NOT-Q output of flip-flop 530. The output of divider 525 is a signal whose frequency is equal to the input dither frequency, but with an arbitrary phase displacement. However, the combination of circuits 540-530 phase adjust the output of divider 525 such that the RTS signal is centered between two NOT-Q sampling pulses separated by one half of the dither period. In the steady state condition, the strobe pulse signal RTS is such that the timing signals having frequency F/2 and frequency 3F/2 occur uniformally during half the time of the RTS cycle as illustrated in FIG. 5a.

It should be understood by those skilled in the art that the apparatus described herein may be applicable to any information signal having a periodic bias applied in some manner which causes a spill-over into the output signal. Accordingly, if a timing signal, or the like, representative of the bias period is available, appropriate sampling as described by the application of the present invention may be utilized to obtain useful information devoid of the spill-over.

The embodiment shown in the present application have all been illustrated with a ring laser angular rate sensor. However, the invention of the present application is not limited in scope to such sensors. Furthermore, a triangular sensor was used as an illustration, however the invention of the present application is not limited to triangular ring lasers. Specifically, any laser system having a periodic bias applied thereto in the form of rotational oscilations or by optically providing an alternating bias is within the intended scope of the present application.

Thus, it will be appreciated that although specific embodiments in the invention have been shown and described herein, modifications may be made. It is intended that the following claims cover all the modifications which come within the true spirit and scope of the invention of the present application.

The embodiments of the invention in which an exclusive property right is claimed are defined as follows:

1. An apparatus for removing a periodic signal from an information signal comprising:
    means for providing an indication of the period of said periodic signal;
    means for obtaining first and second values of said information signal corresponding to first and second times, respectively, in which said second time is delayed in time relative to said first time by one half of said period; and
    means for taking the average of said first and second values and providing a signal indicative thereof.

2. The apparatus of claim 1 wherein said periodic signal is sinusoidal.

3. The apparatus of claim 1 further comprising: means for providing a strobe pulse; and means for obtaining said first and second values centered in time about said strobe pulse.

4. In an inertial sensor system having at least a first ring laser angular rate sensor including a first biasing means for providing an alternating sensor bias of a first frequency, a second ring laser angular rate sensor including a second biasing means for providing an alternating sensor bias of a second frequency, and wherein each of said sensors provides a sensor output representative of the rotation thereof, the improvement comprising:
    means for providing a first strobe pulse;
    first means for obtaining first and second values of said first sensor output signal corresponding to first and second times, respectively, in which said second time is delayed in time relative to said first time by one half of the period of said first frequency, and said first and second times are centered in time about said strobe pulse;
    second means for taking the average of said first and second values thereby providing a filtered output signal of said first sensor;
    third means for obtaining first and second values of said second sensor output signal corresponding to third and fourth times, respectively, in which said fourth time is delayed in time relative to said third time by one half of the period of said second frequency, and said third and fourth times are centered in time about said strobe pulse; and
    fourth means for taking the average of said first and second values of said second sensor output signal thereby providing a filtered output signal of said second sensor.

5. In an inertial sensor system having at least a first ring laser angular rate sensor including a first biasing means for providing an alternating sensor bias of a first frequency, a second ring laser angular rate sensor including a second biasing means for providing an alternating sensor bias of a second frequency, and a third ring laser angular rate sensor having a third biasing means for providing an alternating sensor bias at a third frequency, and wherein each of said sensors provides a sensor output representative of the rotation thereof the improvement comprising:
    means for providing a first strobe pulse;
    first means for obtaining first and second values of said first sensor output signal corresponding to first and second times, respectively, in which said second time is delayed in time relative to said first time by one half of the period of said first frequency, and said first and second times are centered in time about said strobe pulse;
    second means for taking the average of said first and second values thereby providing a filtered output signal of said first sensor;
    third means for obtaining first and second values of said second sensor output signal corresponding to third and fourth times, respectively, in which said fourth time is delayed in time relative to said third time by one half of the period of said second frequency, and said third and fourth times are centered in time about said strobe pulse;
    fourth means for taking the average of said first and second values of said second sensor output signal thereby providing a filtered output signal of said second sensor;
    fifth means for obtaining first and second values of said third sensor output signal corresponding to fifth and sixth times in which said sixth time is delayed in time relative to said fifth time by one half of the period of said third frequency, and said fifth and sixth times are centered in time about said strobe pulse; and
    sixth means for taking the average of said first and second values of said third sensor output signal thereby providing a filtered output signal of said third sensor.

6. The apparatus of claim 5 wherein each of said first, second, and third biasing means comprises means for rotationally oscilating each said sensors.

7. An apparatus comprising:

a ring laser angular rate sensor having a pair of counter-propagating wave;

means for biasing said waves with a periodic bias;

means for providing an indication of the period of said periodic bias;

output means for providing a sensor output signal representative of rotation of said sensor; and means for obtaining first and second values of said sensor output signal corresponding to first and second times, respectively, in which said second time is delayed in time relative to said first time by one half of said period;

means for taking the average of said first and second values and providing a signal indicative thereof.

8. An apparatus for removing a periodic signal from an information signal comprising:

means for providing a timing signal indicative of occurrences of said periodic signal;

means responsive to said timing signal for obtaining first and second values of said information signal corresponding to first and second times, respectively, in which said second time is delayed in time relative to said first time by one half of the period of said periodic signal; and means for taking the average of said first and second values and providing a signal indicative thereof.

9. The apparatus of claim 8 further comprising:

means for providing a strobe pulse; and means for obtaining first and second values centered in time about said strobe pulse.

* * * * *